United States Patent [19]

Costa et al.

[11] Patent Number: 4,752,032
[45] Date of Patent: Jun. 21, 1988

[54] VEHICLE HEADLIGHT WITH A BUILT-IN SPRAY WASHING DEVICE

[75] Inventors: Gian F. Costa; Giorgio Manunta, both of Turin, Italy

[73] Assignee: Carello S.p.A., Turin, Italy

[21] Appl. No.: 74,748

[22] Filed: Jul. 17, 1987

[30] Foreign Application Priority Data

Jul. 18, 1986 [IT] Italy .................. 53642/86[U]

[51] Int. Cl.⁴ .............................................. B05B 1/10
[52] U.S. Cl. ................... 239/284.2; 362/61; 134/178; 134/199
[58] Field of Search .................. 239/284.1, 284.2; 134/178, 180, 181, 199; 362/61

[56] References Cited

U.S. PATENT DOCUMENTS 4,285,470 8/1981 Roth ........................... 239/284.2

FOREIGN PATENT DOCUMENTS 2363462 5/1978 France .......................... 362/61

Primary Examiner—Andres Kashnikow
Assistant Examiner—Mary Beth O. Jones
Attorney, Agent, or Firm—Klauber & Jackson

[57] ABSTRACT

A vehicle headlight having a glass front and an outer frame surrounding the glass front and supporting at least one sprayer directed towards the same; which frame is hinged to the headlight in such a manner as to turn about an axis in relation to the same, by virtue of a hydraulic piston powered by a compressed fluid supplying the aforementioned sprayer.

7 Claims, 2 Drawing Sheets

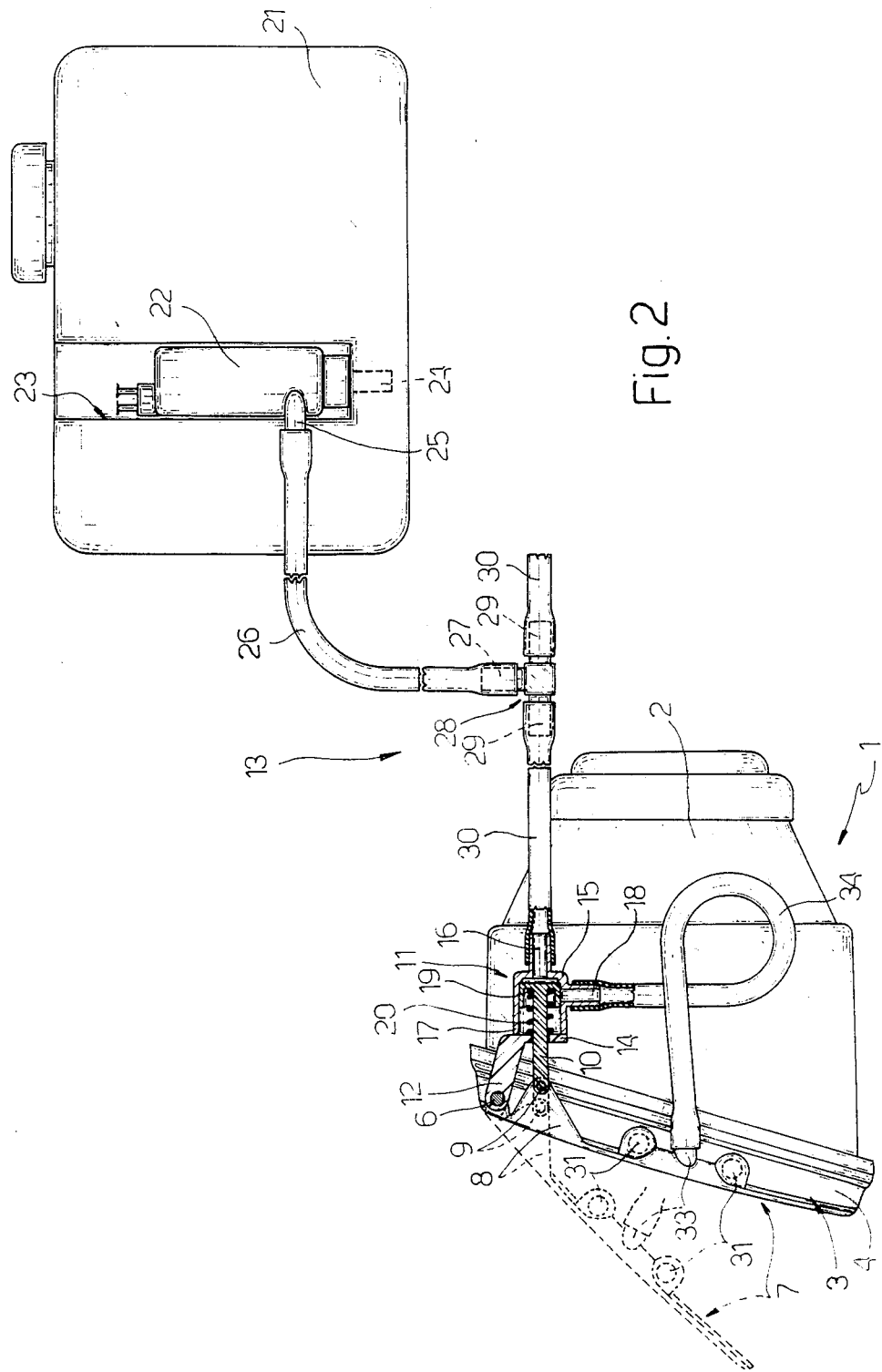

VEHICLE HEADLIGHT WITH A BUILT-IN SPRAY WASHING DEVICE

BACKGROUND OF THE INVENTION

The present invention relates to a vehicle, in particular a motor vehicle, headlight having a built-in spray washing device.

Motor vehicle headlights featuring spray devices are already known, which spray device comprises at least one ejector designed to move between a idle position, wherein it contacts the front surface of the headlight, and an operating position, wherein it is raised in relation to the said front surface. The said ejector is usually set to the said operating position by exploiting, in various ways, the pressure of a liquid detergent supplied to the ejector by means of a pump.

A major drawback of known spray devices of the aforementioned type is that they are easily damaged both by outside air and by the atmospheric and environmental agents they are continually exposed to. Furthermore, the said ejectors are usually visible from the outside, the asesthetic effect of which is somewhat debatable.

SUMMARY OF THE INVENTION

The aim of the present invention is to provide a headlight featuring a built-in spray device, designed to overcome the aforementioned drawbacks.

With this aim in view, according to the present invention, there is provided a vehicle headlight comprising a glass front and a spray device for washing the same; characterised by the fact that the said spray device comprises an outer frame surrounding the said glass front, the said frame being designed to turn about an axis and in relation to the said glass front between an idle position substantially contacting the said glass front and a raised operating position; at least one sprayer fitted to the said frame and directed towards the said glass front; supply means for supplying the said sprayer with compressed liquid; and hydraulic actuating means for moving the said frame between the said two positions; the said hydraulic means communicating with the said supply means.

BRIEF DESCRIPTION OF THE DRAWINGS

A number of non-limiting embodiments of the present invention will be described with reference to the accompanying drawings, in which:

FIG. 2 shows a schematic, partially-sectioned side view of the FIG. 1 headlight fitted with a spray device;

DETAILED DESCRIPTION OF THE INVENTION

Figure 1:
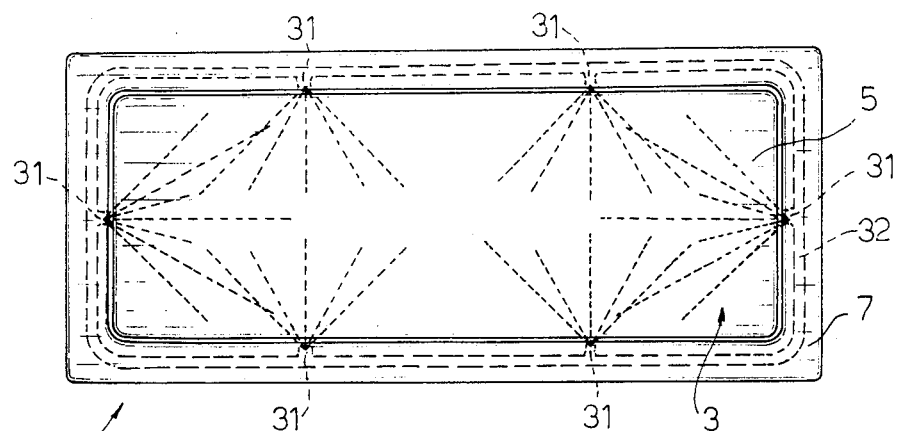
FIG. 1 shows a front view of a preferred embodiment of the headlight according to the present invention.
Figure 4:
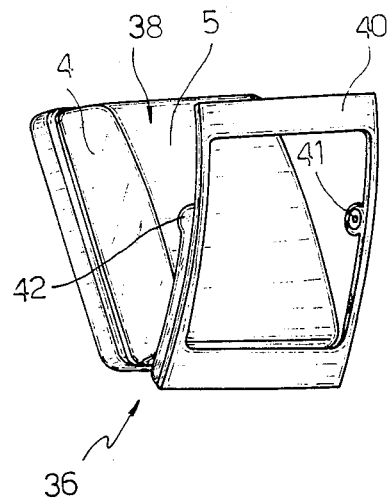
FIG. 4 shows a partial view in perspective of a second variation of the FIG. 1 headlight.
Figure 3:
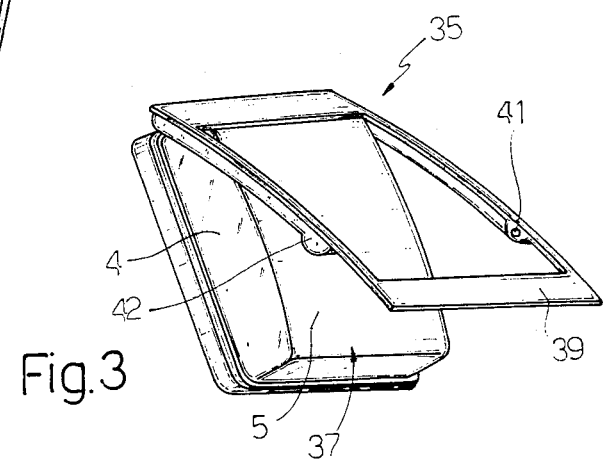
FIG. 3 shows a partial view in perspective of a first variation of the FIG. 1 headlight.

In FIG. 1, and particularly in FIG. 2, number 1 indicates a motor vehicle headlight comprising a cup-shaped rear body 2 closed in at the front by a transparent glass front or shield 3 which, in the example shown, is substantially rectangular in shape. Glass front 3 is also cup-shaped and comprises a tubular lateral wall 4 extending towards the open end of rear body 2 from the edge of a substantially flat end wall 5 (FIG. 1).

Close to the top edge of glass front 3, wall 4 is fitted through with two coaxial pins 6 (only one of which is shown) to which are hinged a frame 7 which, when idle, is arranged contacting the edge of wall 5. The said frame 7 presents a lateral appendix 8 substantially parallel with wall 4 and fitted through with a pin 9 parallel with pins 6. Pin 9 constitutes the pin of a hinge connecting appendix 8 to the end of an output rod 10 on a hydraulic cylinder 11 connected to one of pins 6 by means of an external appendix 12 and forming, together with frame 7, part of a spray device 13.

Cylinder 11 comprises a cover 14 integral with appendix 12 and fitted through with rod 10; an end wall 15 opposite cover 14 and fitted through with an inlet pipe 16; a cylindrical side wall 17 extending between cover 14 and end wall 15 and fitted through, close to end wall 15, with an outlet pipe 18; and a tubular piston 19 integral with rod 10 and designed to travel, starting from an idle position contacting end wall 15, along cylinder 11 in the direction of cover 14 and against the thrust exerted by a spring 20.

As shown in FIG. 2, piston 19, when idle, acts as a valve element for cutting off communication between pipes 16 and 18, which are allowed, however, to communicate via cylinder 11 when piston 19 moves a given distance in the direction of cover 14.

Spray device 13 also comprises a tank 21 for liquid detergent; and a pump 22 located inside a housing 23 formed on tank 21, and having an inlet pipe 24 communicating with the inside of tank 21. Pump 22 also presents an outlet pipe 25 communicating, via a hose 26, with the inlet pipe 27 of a three-way fitting 28, of which a first outlet pipe 29 communicates, via a first hose 30, with inlet pipe 16, and a second outlet pipe 29 communicates, via a second hose 30, with the inlet pipe 16 (not shown) of a further headlight 1 (not shown).

Spray device 13 also comprises a number of sprayers 31 directed towards glass front 3, arranged along the sides of frame 7, and connected to one another by a pipe 32 (FIG. 1) formed along frame 7. An inlet portion 33 of pipe 32 projects behind frame 7 and is connected to pipe 18 by a hose 34.

In actual use, frame 7 is usually maintained in the idle position (shown by the continuous line in FIG. 2) contacting glass front 3, by virtue of spring 20 which pulls piston 19 back into contact with the inner surface of end wall 15 on hydraulic piston 11. In the said idle position, piston 19 cuts off communication between pipes 16 and 18, thus preventing any liquid detergent inside hose 26 from reaching sprayers 31.

Subsequent to operation of pump 22 by the user, liquid detergent is supplied under pressure to cylinder 11 along hoses 26 and 30, at the same time causing piston 19 to move in the direction of cover 14 and so compress spring 20, and pipe 18 to open and so allow the said liquid detergent to flow through cylinder 11 to sprayers 31 via hose 34 and pipe 32.

As shown clearly in FIG. 2, displacement of piston 19 against the thrust exerted by spring 20 causes frame 7 to turn about pins 6 into the raised operating position, wherein the jets from sprayers 31 can reach all the points on the outer surface of end wall 5 of glass front 3.

The advantages of spray device 13 will be clear from the foregoing description. First and foremost, frame 7 constitutes an excellent support, both functionally and aesthetically, for sprayers 31. Frame 7, in fact, constitutes an extremely stable support for protecting sprayers 31 from air and external agents, as well as a highly effective finish element on headlight 1, for blending the front surface of headlight 1 with the surrounding vehicle body.

Both headlight 1 and frame 7 may, of course, be formed otherwise than as shown in Fig.s 1 and 2. The variations in Fig.s 3 and 4, for example, show respective headlights 35 and 36 having respective substantially rectangular glass fronts 37 and 38 with the longer sides arranged substantially vertically. The respective frames 39 and 40 present the same shape, and are hinged respectively to the top and bottom edge of respective glass fronts 37 and 38.

Furthermore, frames 39 and 40 both present two sprayers 41 and 42 arranged facing each other on the opposite vertical sides of the respective frame.

We claim:

1. A vehicle headlight comprising a glass front and a spray device for washing the same; characterised by the fact that the said spray device comprises an outer frame surrounding the said glass front, the said frame being designed to turn about an axis and in relation to the said glass front between an idle position substantially contacting the said glass front and a raised operating position; at least one sprayer fitted to the said frame and directed towards the said glass front; supply means for supplying the said sprayer with compressed liquid; and hydraulic actuating means for moving the said frame between the said two positions; the said hydraulic means communicating with the said supply means.

2. A headlight as claimed in claim 1, characterised by the fact that the said frame is substantially in the form of a parallelogram; the said axis of rotation being parallel with one edge of the said frame.

3. A headlight as claimed in claim 2, characterised by the fact that the said axis of rotation substantially extends along the top edge of the said frame.

4. A headlight as claimed in claim 2, characterised by the fact that the said axis of rotation substantially extends along the bottom edge of the said frame.

5. A headlight as claimed in claim 1, characterised by the fact that the said frame is connected to the said glass front in such a manner as to turn in relation to the same about the said rotation axis.

6. A headlight as claimed in claim 1, characterised by the fact that the said supply means comprise a pump and piping means connecting the said pump to the said sprayer; the said piping means extending through the said hydraulic actuating means, and the said hydraulic actuating means constituting a valve element for cutting off communication between the said sprayer and the said pump when the said frame is in the said idle position.

7. A headlight as claimed in claim 6, characterised by the fact that the said hydraulic actuating means comprise a hydraulic cylinder, in turn, comprising an inlet connected to the said pump, an outlet connected to the said sprayer, and a piston connected to the said frame so as to move the said frame into the said raised operating position against the thrust exerted by elastic means; the said piston cutting off communication between the said inlet and the said outlet when the said frame is in the said idle position.

* * * * *